UNITED STATES PATENT OFFICE.

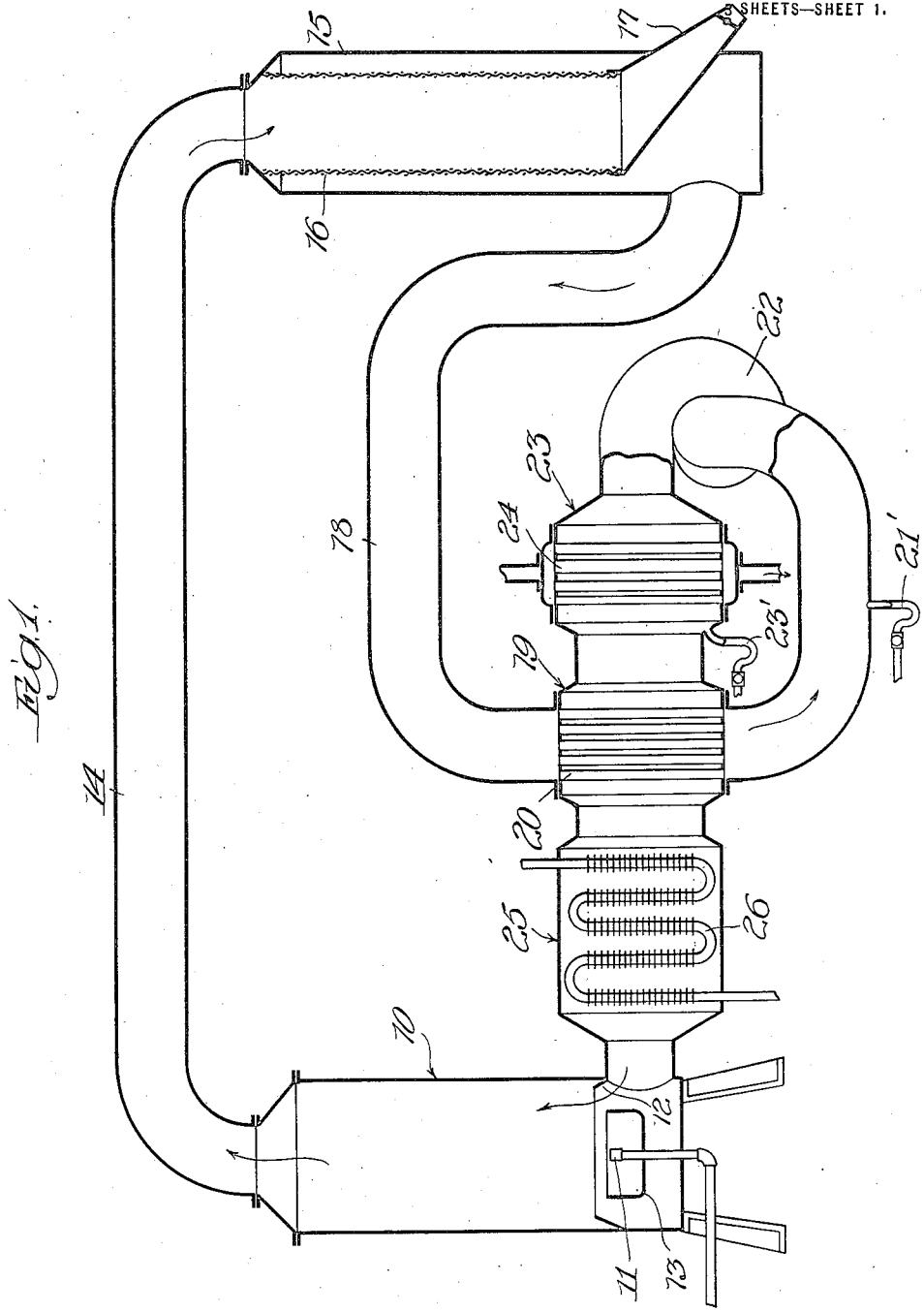

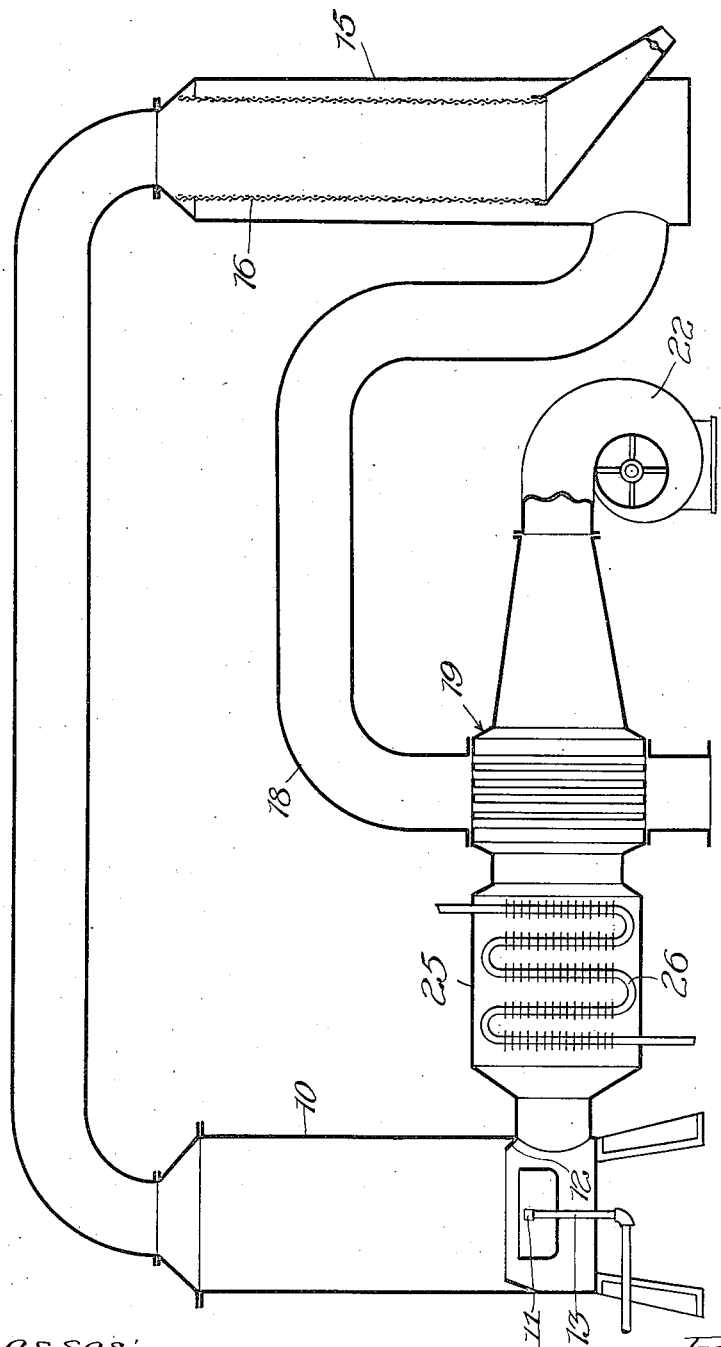

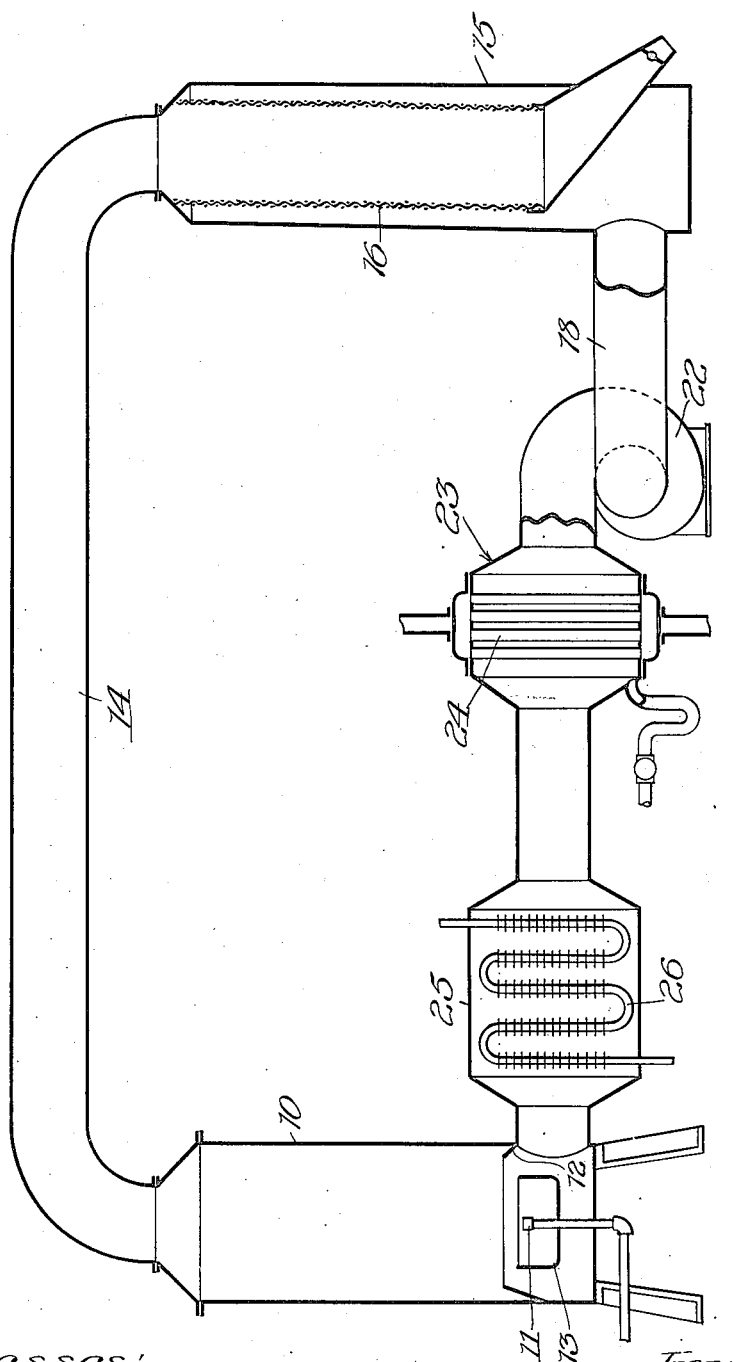

HANS J. ZIMMERMANN, OF CHICAGO, ILLINOIS, ASSIGNOR, BY MESNE ASSIGNMENTS, TO R. STUTZKE COMPANY, A CORPORATION OF ILLINOIS.

ART OF EVAPORATING LIQUIDS.

1,402,467.  Specification of Letters Patent.  Patented Jan. 3, 1922.

Application filed May 20, 1918. Serial No. 235,513.

*To all whom it may concern:*

Be it known that I, HANS JOSEPH ZIMMERMANN, a subject of the Emperor of Germany, residing at Chicago, in the county of Cook and State of Illinois, have invented a new and useful Improvement in the Art of Evaporating Liquids, of which the following is a specification.

My invention relates to the art of evaporating liquids and will be fully understood from the following specification taken in connection with the accompanying drawings, in which—

Fig. 1 is a diagrammatic sectional view of one form of apparatus constructed in accordance with the invention; Fig. 2 is a similar view of a modified construction, and Fig. 3 is a similar view of a still further modification.

Referring first to the construction illustrated in Fig. 1, the numeral 10 designates a vertical cylindrical evaporating chamber, having in the base thereof an upwardly-directed spray-nozzle 11, which sprays into an annular air-stream produced by a conical ring 12 secured to the side wall of the evaporating chamber at the zone of the nozzle, and an inner cup 13 of substantial diameter and concentric with the nozzle. From the top of the evaporating chamber 10 a conduit 14 leads to a dust-collector 15, in which the gas or vapor-current is filtered through a screen 16 to separate the finely divided solids carried in suspension therein, these solids being withdrawn from the base of the collector through the spout 17, into which they drop by gravity. From the base of the dust-collector chamber a conduit 18 leads to a heat-exchanger 19, which is in the form of a casing having vertical heating tubes 20 for the passage of the gases or vapors delivered by the conduit 18. From the base of the heat-exchanger 19 a conduit 21 conducts the vapors or gases to the inlet side of a centrifugal blower 22, the outlet side of which discharges into a cooler or condenser 23 comprising a casing similar to the heat-exchanger 19, but having its tubes 24 kept filled with a cooling agent, such as water, which flows through the tubes, as is indicated by the arrows. The gases or vapors delivered by the blower 22 pass around the tubes 24, and are next delivered to the heat-exchanger 19 in which they pass around the tubes 20. Beyond the heat-exchanger there is provided a heating chamber 25 filled with radiating coils 26, or otherwise heated.

The apparatus described in the foregoing is preferably operated in the following manner: The blower 22 is set in motion to cause a circulation of the air through the system in the direction indicated by the arrows. Cooling water is supplied to the tubes 24 of the cooler, and steam or other heating fluid to the radiating coils 26 of the heater. The liquid to be evaporated, for example milk, from which it is desired to recover the solid constituents in a dry form, is introduced under appropriate pressure through the nozzle 11, by the agency of which it is subdivided in the form of a fine spray. This spray is subjected at its outer portions, and when it has had time to fully develop, to the action of the annular blast of heated air ascending in the space between the wall of the cup 13 and the cone 12. In the example given, the rate of introduction of the milk will be adjusted to the volume temperature and degree of saturation of the air supplied, so as to effect complete evaporation of the liquid constituents of the milk within the chamber 10. The current of air now containing a considerable percentage of water vapor, and carrying in suspension the finely divided solids of the milk, is conveyed by the conduit 14 through the dust-filter 15 in which the milk solids are for the most part precipitated, being withdrawn from time to time or continuously through the spout 17. The moisture-laden and heated air current substantially freed of its suspended solid matter passes by the conduit 18 to the heat-exchanger 19 and through the vertical tubes 20 thereof, being substantially reduced in temperature in its passage through these tubes, the lost heat being given up to the air passing horizontally through the heat-exchanger and around the tubes 20 thereof, as will later appear. According to the degree of cooling effected in the heat-exchanger tubes 20 and to the degree of saturation of the air current, there may be more or less condensation at this point. Any condensate thus obtained will drain to the base of the conduit 21, from which it may be withdrawn through the trapped outlet 21¹. The partially cooled air current, after passing through the blower 22, is delivered to the cooler or condenser 23, in which it is subjected to a further cooling action by the aid of the water-circulating tubes 24. There will, in general, be a considerable condensation within the cooler 23, this condensate being withdrawn through the trapped outlet 23¹. The air current passing from the cooler 23 will be at a relatively low temperature, a temperature somewhat above that of the cooling water 24, and will be saturated with water vapor at this temperature. This cooled and saturated air current now passes around the tubes 20 of the heat-exchanger 19, in which its temperature is considerably elevated, being thereby proportionately dried, that is, brought to a condition of unsaturation. The initial heating and drying effect obtained by the heat-exchanger 19 is supplemented by the radiating coils 26, by the aid of which circulating air current is further elevated in temperature, and thus rendered comparatively dry. In this heated and relatively dry condition the air current now re-enters the base of the evaporating chamber 10, thus beginning a new cycle.

It will be noted as characteristic of the method of operation described that there is continuously employed for the evaporation of the liquid the same body of drying medium (in the example given this medium being air). The drying medium circulates through a closed system of conduits, including the evaporating chamber, dust-collector, heat-exchanger, condenser, or cooler, through the other side of the heat-exchanger, through a heater and back to the evaporating chamber, the circulation being obtained by a blower included within the system. The evaporating medium is therefore successively partially cooled and saturated, relieved of suspended solids, in the example given, further cooled and rendered more nearly saturated in the heat-exchanger, brought to a comparatively low temperature and an accompanying condition of supersaturation with deposition of excess moisture in the cooler, initially heated and dried in the heat-exchanger, further heated and dried in the heater, to be again cooled and rendered partially saturated by evaporation of the spray within the evaporating chamber.

Under uniform running conditions it is, of course, self-evident that the amount of liquid condensate withdrawn from the traps 21¹, 23¹, must equal the rate of evaporation from the spray nozzle 11, since the system is entirely closed, liquid only being admitted and liquid only withdrawn. By virtue of this condition the method of operation described is particularly advantageous not only from the standpoint of economy in the use of heat, but likewise in the protection of the liquid to be evaporated and of the solids derived therefrom from the possibility of contamination, which inevitably would result from the employment of a system in which the evaporation was carried out by the continuous introduction of atmospheric air into the apparatus. Furthermore, the continued use of the same gaseous evaporating medium carries with it the possibility of employing a relatively expensive gas, such, for example, as carbon dioxide, nitrogen, or oxygen, where it is desired either to prevent oxidation or other chemical change in the product, or to effect a certain predetermined chemical change.

In Fig. 2 I have illustrated a modification of the apparatus of Fig. 1, this last construction being identical with that heretofore described, save for the fact that the system is an open one instead of a closed or circulating one. Thus, in Fig. 2 the air enters the blower 22 directly from the atmosphere, and this air being of itself relatively dry, therefore does not require the action of the cooler and condenser 23. In the construction shown in Fig. 2, therefore, the outlet side of the blower is connected directly with the heat-exchanger 19, and the heated air passing through the tubes 20 of the heat-exchanger is itself discharged directly to the atmosphere. The advantage of economy of heat is attained in Fig. 2 as in Fig. 1.

In Fig. 3 I have illustrated a further modification of the apparatus of Fig. 1. The construction of Fig. 3 differs from that of Fig. 1 only in that the heat-exchanger is omitted from the circulating system. Thus, in Fig. 3 the blower 22 has its inlet side connected directly with the conduit 18, which leads from the base of the dust-collector 15. The outlet side of the blower 22 discharges directly into the cooler and condenser 23, the entire duty of lowering the temperature and condensing out the moisture from the circulating atmosphere being in this construction assumed by the cooler and condenser. This construction retains the advantages of the construction of Fig. 1 in so far as the same are resultant upon the use of a continuously circulating evaporating medium.

While I have in the foregoing particularly described a preferred embodiment of my invention, together with some variants thereof, it will be understood that this is illustrative only, and for the purpose of making the invention more clear, and that I do not regard the invention as limited to the construction or method of operation specifically illustrated and described, except in so far as such limitations are included within the terms of the accompanying claims, in which it is my intention to claim all novelty inherent in my invention as broadly as is permissible in view of the prior art.

What I claim is:

1. The method of evaporating liquids, which consists in maintaining a circulation of a gaseous evaporating medium through a closed system of conduits, introducing the substance from which the liquid is to be evaporated, into the circulating medium, initially cooling the circulating medium beyond the point of liquid introduction by exchange of heat with the circulating medium entering the zone of evaporation, further cooling the circulating medium to condense therefrom the evaporated liquid, reheating the said cooled medium initially by exchange of heat as aforesaid, and finally heating the circulating medium to restore it to its original condition before entering the zone of evaporation.

2. An evaporation apparatus comprising an evaporating chamber, means for introducing the liquid containing substance thereinto, means for maintaining a closed circulation of a gaseous evaporating medium from and back to the said chamber, means interposed in the system for cooling the evaporating medium; and means for effecting an exchange of heat between the evaporating medium leaving the said chamber and the medium entering the chamber after having passed through said cooling means.

3. An evaporation apparatus comprising a closed system as follows: an evaporating chamber having means for introducing the liquid containing substance thereinto, a heat exchanger, means for conveying gaseous evaporating medium from the evaporating chamber to the warmer passages of the heat exchanger, a cooler and condenser, means for conveying gaseous evaporating medium from the heat exchanger to the cooler and condenser, a final heater, a connection from the cooler and condenser through the cooler passages of the heat exchanger to the final heater and to the evaporating chamber and means for maintaining a circulation through the closed system.

HANS J. ZIMMERMANN.